(12) United States Patent
Serge et al.

(10) Patent No.: US 12,359,902 B2
(45) Date of Patent: Jul. 15, 2025

(54) COLUMN DEPTH MEASURING GUIDE (71) Applicant: AGILENT TECHNOLOGIES, INC., Santa Clara, CA (US)

(72) Inventors: Lucas Serge, Wilmington, DE (US); Wei J. Song, Vancouver, WA (US); Eileen Huang, Hamburg (DE); Olga Schikurski, Karlsruhe (DE); Kathleen Noblet, Lafayette, CO (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 17/824,604

(22) Filed: May 25, 2022

(65) Prior Publication Data
US 2023/0384079 A1    Nov. 30, 2023

(51) Int. Cl.
*G01B 5/18* (2006.01)
*G01B 5/00* (2006.01)
*G01N 30/60* (2006.01)

(52) U.S. Cl.
CPC ............ *G01B 5/18* (2013.01); *G01B 5/0002* (2013.01); *G01B 5/0004* (2013.01); *G01B 5/0009* (2013.01); *G01N 30/60* (2013.01); *G01N 30/6047* (2013.01)

(58) Field of Classification Search
CPC .. G01B 5/0009; G01B 5/0004; G01B 5/0002; G01B 5/18; G01N 30/6047; G01N 30/60
See application file for complete search history.

(56) References Cited

U.S. PATENT DOCUMENTS

| | | | |
|---|---|---|---|
| 1,389,486 A | 8/1921 | Joseph | |
| D249,124 S | 8/1978 | Oberg | |
| 4,150,488 A | 4/1979 | Behnke | |
| D252,451 S | 7/1979 | Behnke | |
| 4,178,646 A | 12/1979 | Swartz et al. | |
| D310,339 S | 9/1990 | Tofte et al. | |
| D346,752 S | 5/1994 | Krusling et al. | |
| 5,342,515 A * | 8/1994 | Radmacher | B01D 15/22 96/104 |
| 5,402,668 A * | 4/1995 | Murakami | G01N 33/0016 73/19.02 |
| 5,459,936 A | 10/1995 | Stange | |
| D379,155 S | 5/1997 | Bond | |
| 5,685,085 A | 11/1997 | Bond | |
| D413,276 S | 8/1999 | Jacoff | |
| D425,622 S | 5/2000 | Tam | |
| D428,492 S | 7/2000 | Tam | |

(Continued)

FOREIGN PATENT DOCUMENTS

| | | | |
|---|---|---|---|
| CN | 203156825 U | * | 8/2013 |
| CN | 205861023 U | | 1/2017 |

(Continued)

OTHER PUBLICATIONS

Ex Parte Qualy Office Action for U.S. Appl. No. 29/840,063, dated Jul. 19, 2023, 16 pages.

(Continued)

*Primary Examiner* — Paul M. West (57) ABSTRACT

A device, including a body including a first post and a second post positioned on opposite sides of a recessed area is disclosed. An assembly including the device is disclosed. A method of using the device is also disclosed.

19 Claims, 7 Drawing Sheets

(56) References Cited

U.S. PATENT DOCUMENTS

| | | |
|---|---|---|
| D429,654 S | 8/2000 | Pochurek |
| 6,730,216 B2 | 5/2004 | Heringa et al. |
| D495,262 S | 8/2004 | Sandler et al. |
| D568,772 S | 5/2008 | Li et al. |
| D610,477 S | 2/2010 | Li et al. |
| D639,684 S | 6/2011 | Essel |
| 8,062,516 B2 | 11/2011 | Silva et al. |
| D657,271 S | 4/2012 | Quint, Jr. |
| D657,272 S | 4/2012 | Quint, Jr. |
| D717,149 S | 11/2014 | Tinius |
| D740,096 S | 10/2015 | Schamberg |
| 9,625,246 B2 | 4/2017 | Rodriguez |
| D818,380 S | 5/2018 | Cummings |
| D869,967 S | 12/2019 | Turley |
| D882,078 S | 4/2020 | Kangastupa |
| D907,241 S | 1/2021 | Thao et al. |
| D920,815 S | 6/2021 | Wang |
| D927,333 S | 8/2021 | Liu |
| D961,370 S | 8/2022 | Brusasco et al. |
| D962,748 S | 9/2022 | Fu |
| D970,746 S | 11/2022 | Matsuzawa |
| D990,304 S | 6/2023 | Geiger |
| 2002/0158016 A1* | 10/2002 | Norberg ............... G01N 1/4005 436/178 |
| 2012/0085462 A1* | 4/2012 | Maier-Rosenkranz ..................... G01N 30/56 141/311 R |
| 2018/0082802 A1* | 3/2018 | Yuan ....................... H01H 13/14 |
| 2021/0367411 A1* | 11/2021 | Rodriguez ............... H02G 1/00 |
| 2022/0003724 A1 | 1/2022 | White et al. |
| 2022/0283038 A1* | 9/2022 | Pradun ..................... G01K 1/16 |

FOREIGN PATENT DOCUMENTS

| | | |
|---|---|---|
| CN | 205941486 U | 2/2017 |
| CN | 110133165 B | 7/2021 |

OTHER PUBLICATIONS

Ex Parte Quayle Office Action for U.S. Appl. No. 29/840,052, mailed Jul. 19, 2023, 14 pages.
Ex Parte Quayle Office Action for U.S. Appl. No. 29/840,054, dated Jul. 19, 2023, 14 pages.
Notice of Allowance for U.S. Appl. No. 29/840,058, mailed Aug. 4, 2023, 15 pages.
Notice of Allowance for U.S. Appl. No. 29/840,055, mailed Aug. 4, 2023, 15 pages.
Notice of Allowance for U.S. Appl. No. 29/840,061, mailed Aug. 4, 2023, 15 pages.

* cited by examiner

COLUMN DEPTH MEASURING GUIDE

FIELD OF THE INVENTION

The present disclosure generally relates to a device, such as a column depth measuring guide, including a body including a first post and a second post positioned on opposite sides of a recessed area is disclosed. An assembly including the device is disclosed. A method of using the device is also disclosed.

BACKGROUND OF THE INVENTION

Accurately measuring a correct depth of a gas chromatography (GC) column, can require up to three hands, i.e., one hand to hold a nut, one hand to hold a column ruler wafer, and one hand for tightening a collar on a self-tightening column nut thereby securing the column in place. Obviously, a user does not have three hands and therefore a user will likely have an unstable grip on at least one of the column, the nut, and the collar. This unstable grip can result in movement of the column during handling and possibly leading to an inaccurate measurement. This can be especially difficult for a new and/or inexperienced user leading to time inefficiency as well.

Additionally, a proper column measurement requires knowledge of depths and tolerances. A user without this knowledge must look up this information and/or ask a colleague, which again leads to time inefficiency.

Further, the measurements needed for correct inlet/detector depths are written in instruction manuals, or are not explicitly written down at all. To add to the confusion, sometimes a technique may specify a depth rather than a specific number.

What is needed is a device, such as a GC column depth measuring guide, that a user can handle with two hands, and which provides accurate measurements. The device can securely hold a winged column nut in place and can include measurement markings for multiple inlets and detectors.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

In an aspect, there is disclosed a device, comprising a body including a first post and a second post positioned on opposite sides of a recessed area In another aspect, there is disclosed a method of using the device, comprising: providing a nut with a loosened collar; inserting a column into the nut; and placing the nut on a device; wherein the device includes a body including a first post and a second post positioned on opposite sides of a recessed area.

In a further aspect, there is disclosed a device comprising a body including a recessed area having a first portion and a second portion, wherein the first portion has a first depth and a first width that is different from a second depth and a second width of the second portion.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

For simplicity and illustrative purposes, the present disclosure is described by referring mainly to an example thereof. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from the scopes of the present disclosure. Further, the elements depicted in the figures may not be drawn to scale and thus, the elements may have sizes and/or configurations that differ from those shown in the figures.

It is to be understood that both the foregoing general description and the following detailed description are exemplary and explanatory only, and are intended to provide an explanation of various embodiments of the present teachings. In the drawings and in the description that follows, the term "proximal", as is traditional, will refer to the end of the device which is closest to the user while the term "distal" will refer to the end of the device which is furthest from the user. Additionally, any reference to "top", "bottom", "front", "back", "right", and/or "left" are intended to provide relative physical relationships and is not intended to be limiting.

In its broad and varied embodiments, disclosed herein is a device, such as a gas chromatography column depth measuring guide, including a body 10 including a first post 12a and a second post 12b positioned on opposite sides of a recessed area 14, as shown in FIGS. 1-5. The body 10 also includes a guide 16 on a top surface 18 of the body 10. The top surface 18 of the body 10 can also include a plurality of markings 20. The disclosed device can provide reliable and repeatable measurements of a column in one place.

Figure 1:
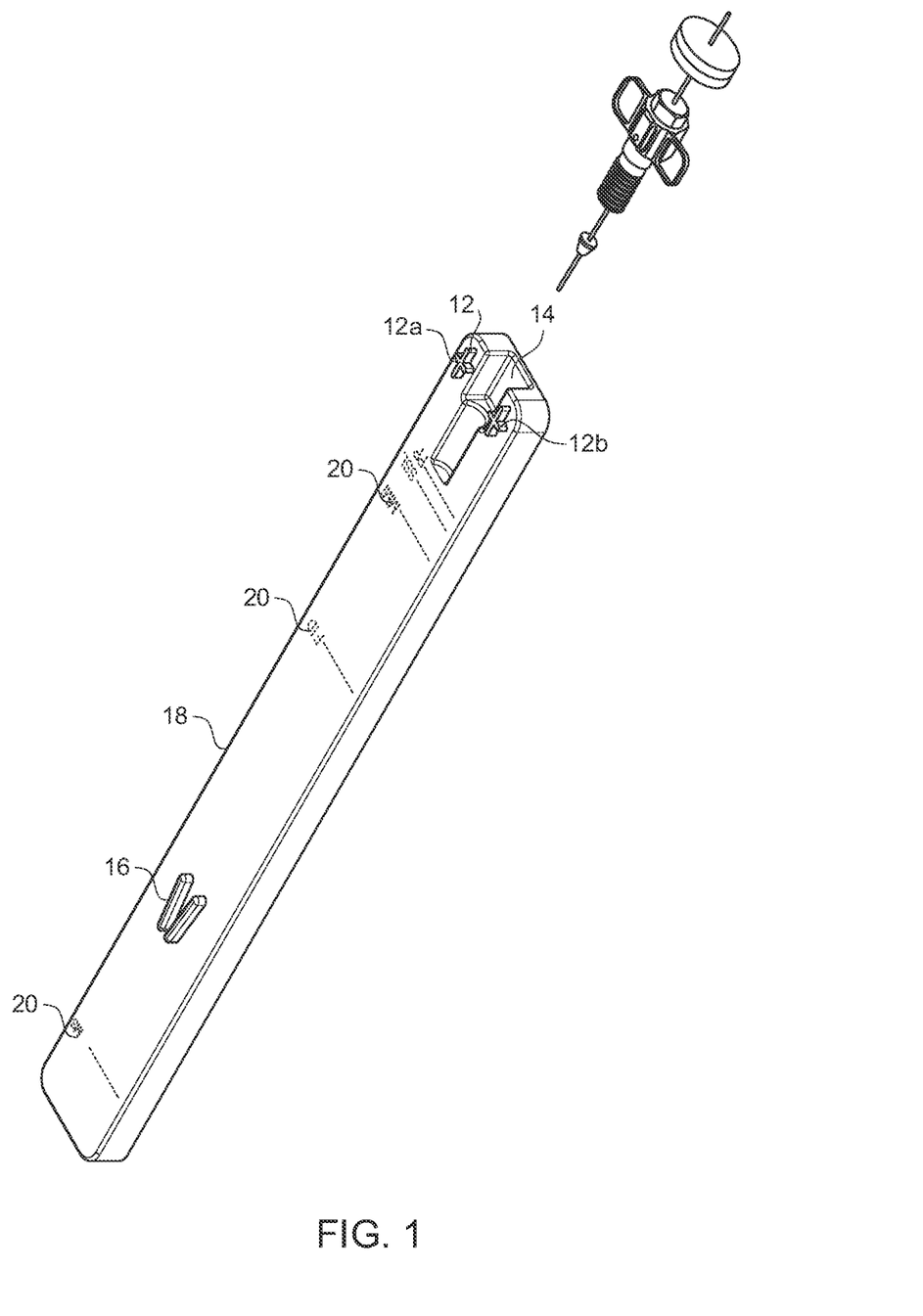
FIG. 1 is a perspective view of a device according to an aspect of the invention.
Figures 6, 7:
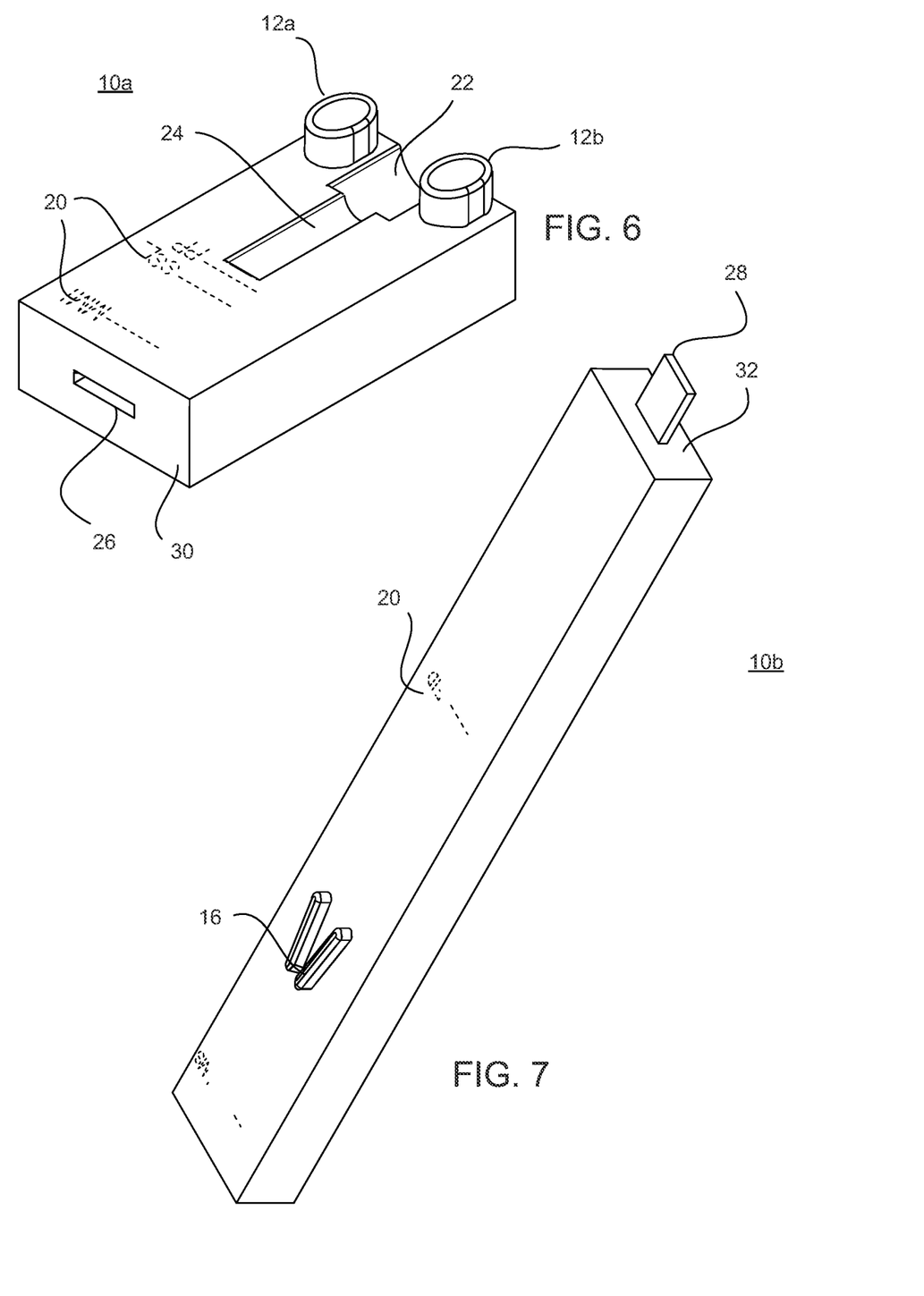
FIG. 6 is a perspective view of a device according to another aspect of the invention.
FIG. 7 is a perspective view of an attachment to the device of FIG. 6.

The device can be a single injection-molded piece in a single cavity mold, for example, as shown in FIG. 1. In an aspect, the device can be multiple pieces that are able to be connected or disconnected, for example, as shown in FIGS. 6 and 7. In a further aspect, the device can be multiple pieces that are connected in a manner so that the device can be present in multiple configurations, such as an extended position or a collapsed position. For example, as shown in FIGS. 8-14, the body 10 can include a first body 10a and a second body 10b. The first body 10a and the second body 10b can move relative to one another.

The body 10 can include a post 12 positioned proximate to the recessed area 14. In an example, the post 12 can include a first post 12a and a second post 12b that can be positioned at a proximal end of the body 10. For example, the first post 12a and the second post 12b can be positioned on opposite sides of the recessed area 14. For the sake of brevity, any disclosure relating to a post 12 is equally applicable to a first post 12a and a second post 12b.

The first post 12a and the second post 12b can be configured and dimensioned to receive a nut, such as at least one flange of a nut. The first post 12a and the second post 12b can be a raised cross shape, as shown in FIG. 1. In an aspect, the first post 12a and the second post 12b can be a raised oval or pill shape, as shown in FIG. 6.

In another aspect, the first post 12a and the second post 12b can be a raised arc shape in which a flange of the nut abuts with an inner surface of the raised arc The post 12 can be one arc shape or can be two or more arc shapes. In particular, the post 12a and the second post 12b can each include one or more posts positioned in a specific area, for example, at a proximal end of the body 10, and on opposite sides of the recessed area 14. For example, the post 12 can be a plurality of posts arranged in an arc, and including a plurality of arcs configured in an oval, in which the center of the oval is hollow. The post 12, in a form of an arc, can be rigid or flexible. The post 12, in a form of a flexible arc, can provide a positive engagement with nut wings. In this manner, the post 12 can be oversized, such as with a zero draft, so that a user can press a winged nut over the post 12, which an flex into position.

The first post 12a can be the same size and shape as the second post 12b. The first post 12a can be a different size or shape as the second post 12b.

Figure 2:
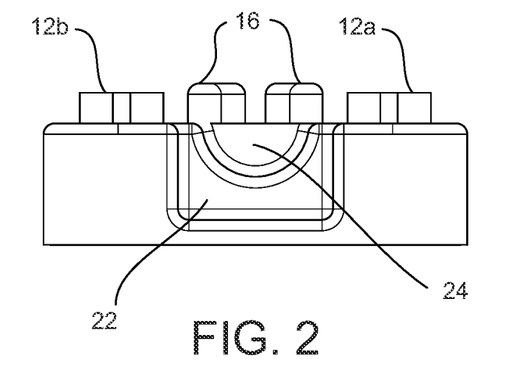
FIG. 2 is a rear view of the device of FIG. 1.
Figure 3:
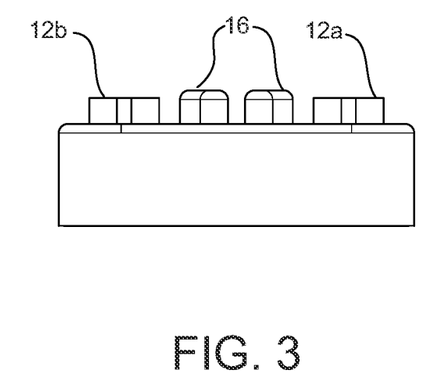
FIG. 3 is a front view of the device of FIG. 1.
Figure 4:
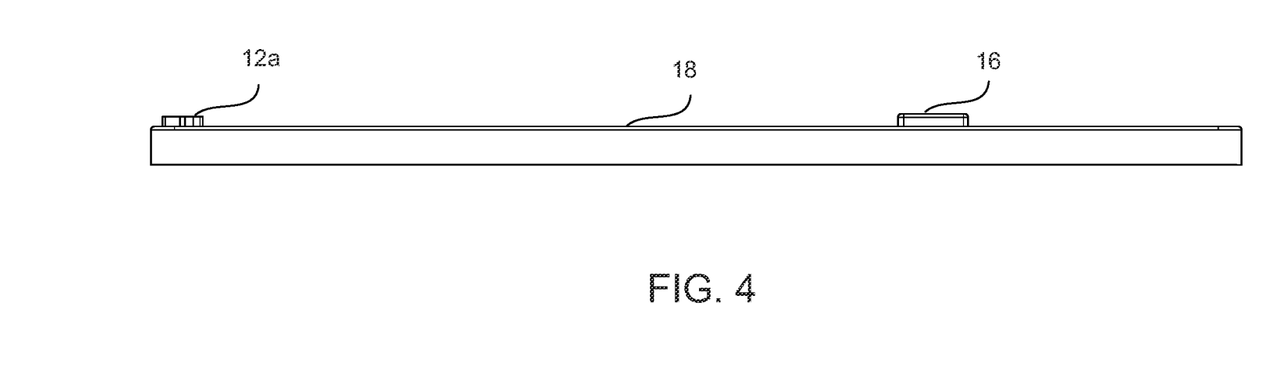
FIG. 4 is a side view of the device of FIG. 1.
Figure 5:
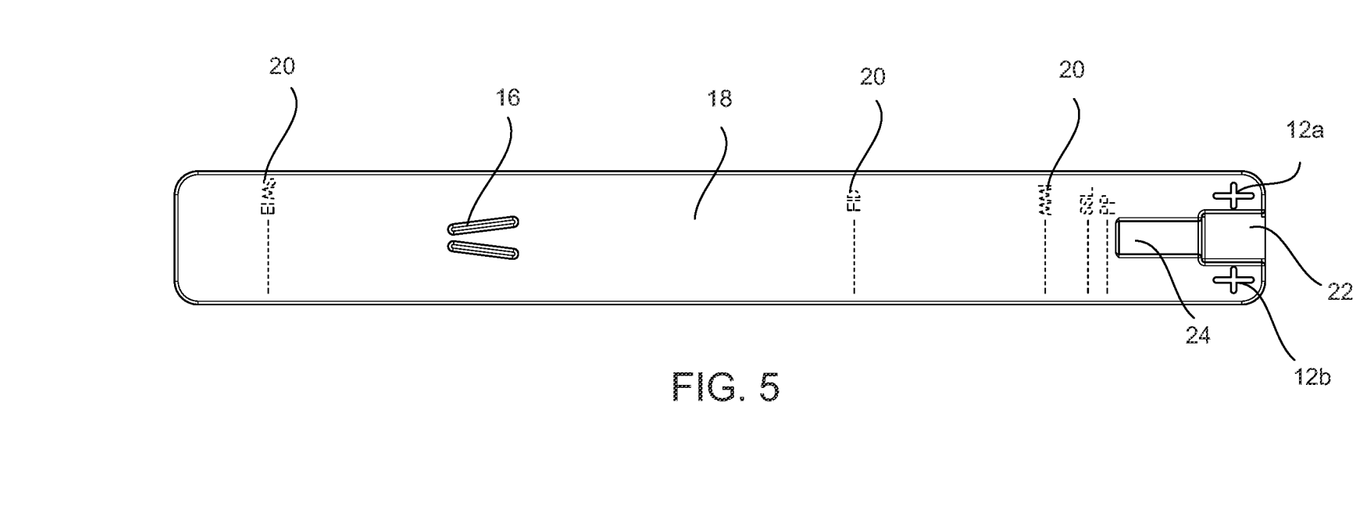
FIG. 5 is a top view of the device of FIG. 1.

The recessed area 14 can include a first portion 22 and a second portion 24. The first portion 22 and the second portion 24 can be in communication with one another. For example, the first portion 22 can be adjacent to the second portion 24. As shown in FIG. 2, the first portion 22 can include a first depth and a first width, and the second portion 24 can include a second depth and a second width that are different from the first depth and the first width. For example, the first depth and the first width of the first portion 22 can be greater than the second depth and the second width of the second portion 24. The first portion 22 can be configured and dimensioned to receive a portion of a nut. In an aspect, the first portion 22 can be a rectangular shape, as shown in FIGS. 1, 2, and 5. The second portion 24 can be configured and dimensioned to receive a portion of a column adapter. In an aspect, the second portion 24 can be cylindrical in shape, as shown in FIGS. 1, 2, and 6.

The guide 16 can support a capillary column along the top surface of the body for longer length measurements. The guide 16 can be a pair of angled bosses, a protrusion with a hole, a recessed channel in the top surface of the body, a discontinuous row of raised bosses, or combinations thereof. As shown in FIG. 1, the guide 16, such as angled bosses, can be located near a distal end of the body 10. The guide 16 can be raised, relative to a top plane of the body 10, for example, when a raised or protruding guide 16 would not impede or limit the use of the device. The guide 16 can be recessed, relative to a top plane of the body 10, for example, when a raised or protruding guide 16 would impede or limit the use of the device. As an example, a recessed guide 16 can be used in the device of FIG. 8 (in which second body 10b slides into first body 10a), FIG. 11 (in which second body 10b pivots/rotates into first body 10a), and/or FIG. 13 (in which second body 10b folds under the first body 10a). The guide 16 can be any size and shape so long as it supports a capillary column along a length of the body 10 from a proximal end to a distal end, relative to a user.

In an aspect, the guide 16 can be a channel recessed into a top surface of the body 10. In an aspect, the channel 16 can extend from near a proximal end of the body 10 to a distal end of the body 10. In another aspect, the guide 16 can extend at least a portion of a length of a second body 10b, for example, a half a length, and as a further example, an entire length. The channel can be any size and shape so long as it can guide a capillary column along a length of the body 10.

The device can also include a plurality of markings. In an aspect, the plurality of markings can be measurement lines for detectors that otherwise are specified by techniques. In another aspect, the plurality of markings can be inlet markings or detector markings. The plurality of markings can also be branding, such as a trade name, trademark, etc. The plurality of markings can be applied to the device using a silk-screen process. In an aspect, the plurality of markings can be applied to the device using a laser marking process FIG. 6 illustrates a device according to another aspect of the invention. The device is as described above with regard to FIG. 1. The body of the device can be a first body 10a having a front surface that can include a slot 26. The slot 26 can be configured and dimensioned to receive a tab 28. For example, the slot can be a rectangular-shaped opening. The device can also include a second body 10b, as shown in FIG. 7 that can connect to the first body 10a. The second body 10b can include a back surface 32 having a tab 28. The second body 10b can also include the guide 16, such as at least one of angle bosses, and a plurality of markings 20, as described herein. The device can include the first body 10a attached to the second body 10b in an extended position. The device can include the first body 10a in a collapsed position, i.e., not attached to the second body 10b.

Figure 8:
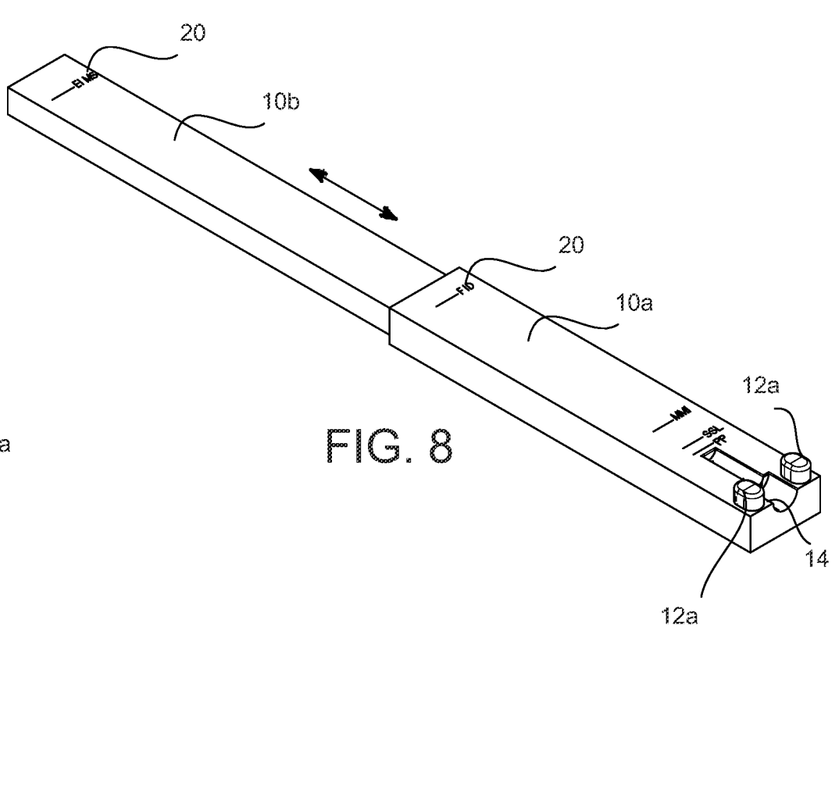
FIG. 8 is a perspective view of a device according to another aspect of the invention.
Figure 9:
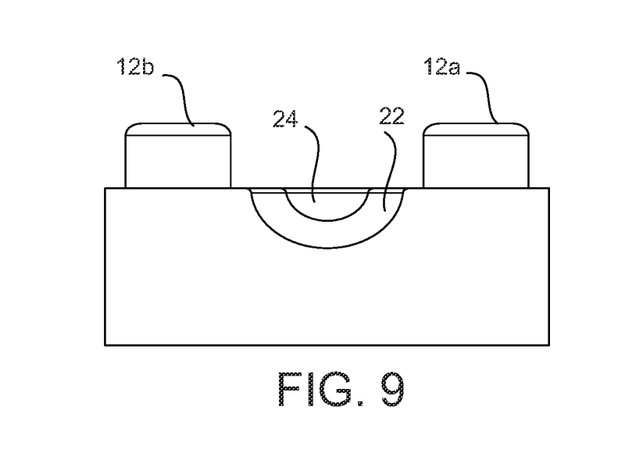
FIG. 9 is a rear view of the device of FIG. 8.
Figure 10:
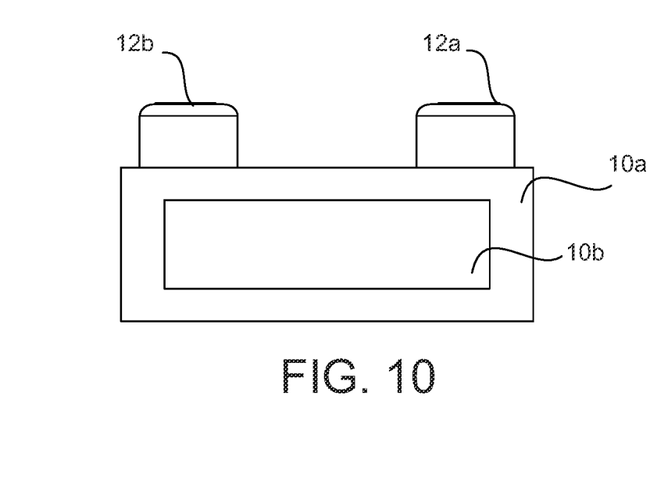
FIG. 10 is a front view of the device of FIG. 8.

FIGS. 8-10 illustrates a device according to another aspect of the invention. The device can include a first body 10a slidably connected with a second body 10b. The first body 10a can include a first post 12a and a second post 12b positioned on opposite sides of a recessed area 14, and optionally a plurality of markings 20. A front surface of the first body 10a can include an opening that is configured and dimensioned to receive the second body 10b. The second body 10b can include at least one marking 20. In an extended position, as shown by the directional areas, the second body 10b can extend out and away from the first body 10a. In a collapsed position, the second body 10b can slide into and within an interior of the first body 10a. FIG. 9 illustrates a rear view of the first body 10a including the recessed area 14 having a first portion 22 and a second portion 24. FIG. 10 illustrates a front view of the device. The first body 10a surrounds the second body 10b.

Figure 11:
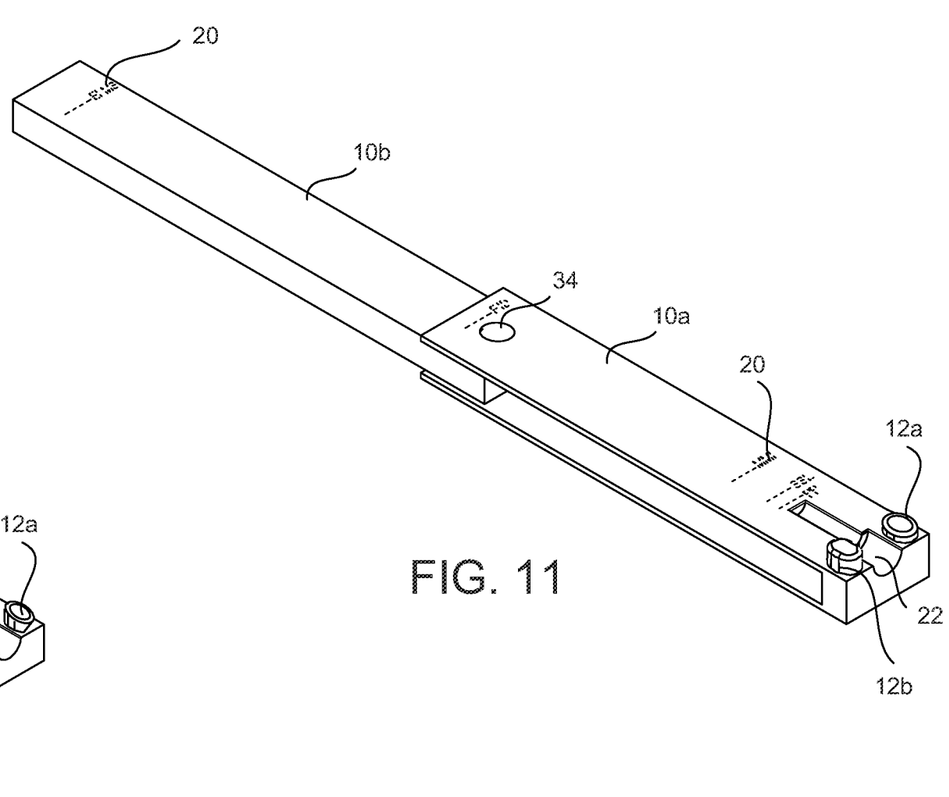
FIG. 11 is a perspective view of a device in an expanded configuration according to another aspect of the invention.
Figure 12:
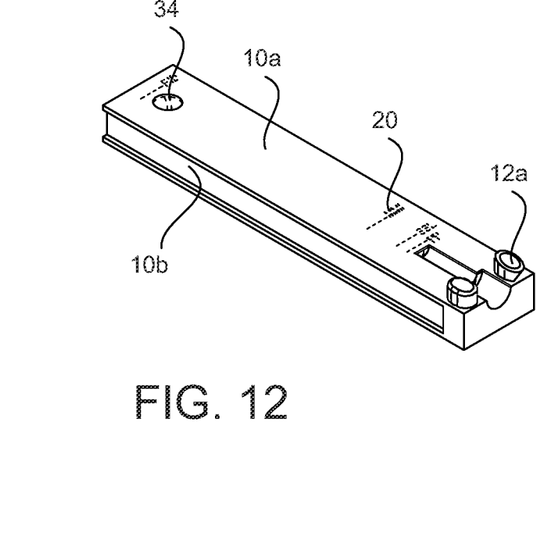
FIG. 12 is a perspective view of the device of FIG. 11 in a collapsed configuration.

FIGS. 11 and 12 illustrate a device according to another aspect of the invention. The device is as described above with regard to FIG. 1. The body of the device can be a first body 10a pivotally connected to a second body 10b by a pin 34. The pin 34 can be any material or device. The pin 34 can extend through the first body 10a and the second body 10b. The first body 10a can include a top surface, a back surface, and a bottom surface. In this manner, at least one side of the first body 10a is substantially void providing an open interior to the first body 10a. The second body 10b can include at least one marking 20 and can be pivotally connected to the first body 10a by the pin 34. In an expanded position, as shown in FIG. 11, the second body 10b can be aligned with and/or substantially positioned outside of the first body 10a. In a collapsed position, as shown in FIG. 12, the second body 10b can be substantially positioned in the interior of the first body 10a.

Figures 13, 14:
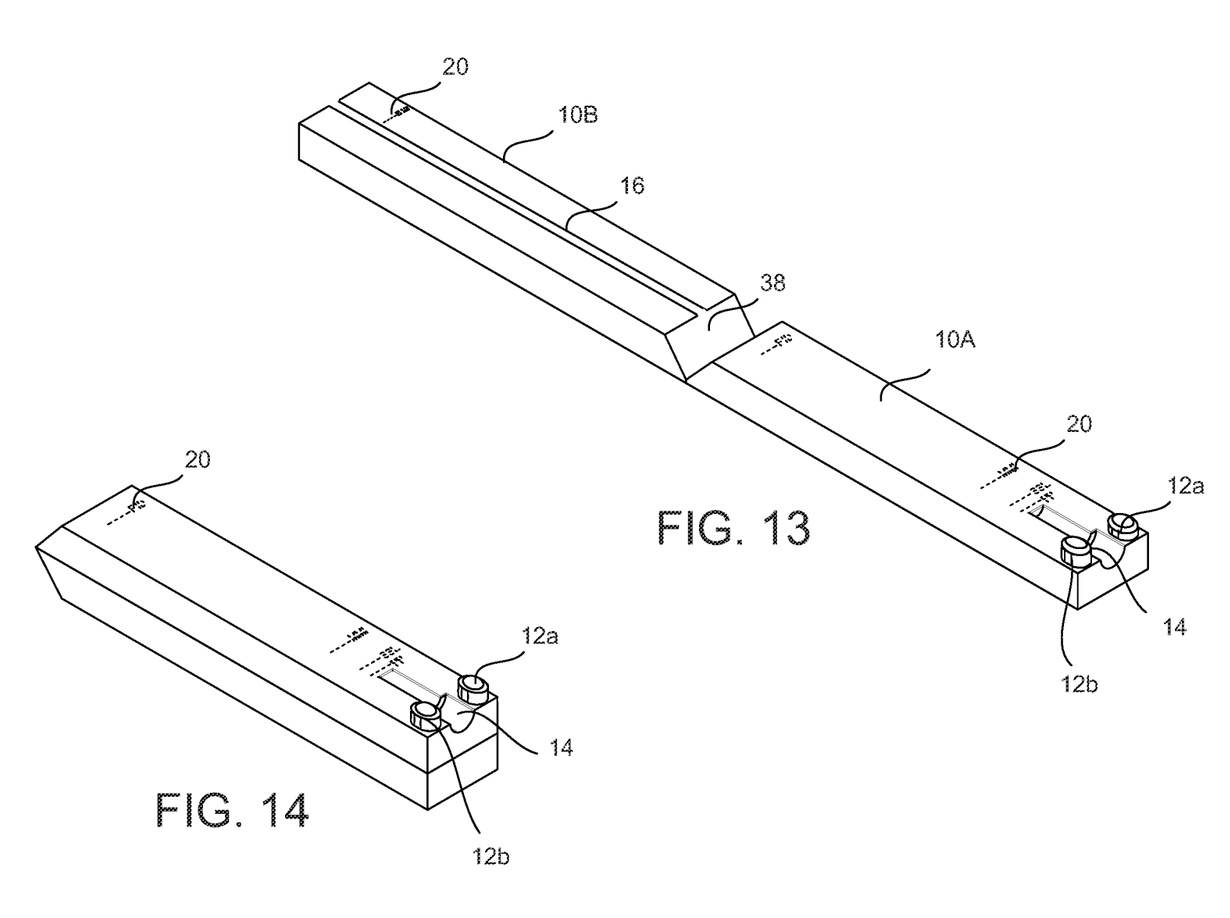
FIG. 13 is a perspective view of a device in an expanded configuration according to another aspect of the invention.
FIG. 14 is a perspective view of the device of FIG. 13 in a collapsed configuration.

FIGS. 13 and 14 illustrate a device according to another aspect of the invention. The device is as described above with regard to FIG. 1. The body of the device can include a body 10 having a two angled surfaces forming a notch 38. The notch 38 can enable the body 10 to fold, for example, in half. In an expanded position, as shown in FIG. 13, a notch 38 is present at a location along a length of the body 10. In a collapsed position, as shown in FIG. 14, the two angled surfaces of the notch 38 allow a first portion of the body to fold against a second portion of the body. In this manner, the bottom surfaces of the device form an interface.

There is also disclosed an assembly including the device and a packaging. The packaging can be a container, such as a bag, that can be configured and dimensioned to receive the device, and optionally a paper insert. The assembly can be a kit. The assembly can also include a column nut that can be configured and dimensioned to attach to the first post 12a and the second post 12b of the device.

There is also disclosed a method of using the device. A user can provide a nut, such as a winged column nut or a self-tightening column nut, with a collar loosened, and can insert a fused silica column into the nut. The nut can include oppositely oriented winged flanges including holes. These holes in the nut can be placed on the first post 12a and the second post 12b of the device to attach the nut with the inserted column to the device. One hand of the user can hold the nut and attached device down on a surface, such as a table. Another hand of the user can push the column further into the nut until a distal end of the column reaches an appropriate marking on the device. The same hand can then tighten the collar of the nut, which inhibits and/or prevents the column from moving in or out of the nut. A user then removes the nut and inserted column from the device. A user takes the nut, inserts the column into an appropriate inlet or detector of an apparatus, and tightens to "hand-tight". At this point, the user can then unscrew the collar and remove the collar from the nut, which remains inserted into the appropriate inlet or detector of an apparatus, such as a gas chromatograph.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

The scope of this disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A device, comprising:
a body including a first post and a second post positioned on opposite sides of a recessed area,
wherein the recessed area includes a first portion and a second portion,
wherein the first portion has a first depth and a first width that is greater than a second depth and a second width of the second portion,
wherein the first width is measured along a partially quadrilateral-shaped area of the first portion,
wherein the second portion includes a semi-cylindrical concave configuration, and
wherein the first portion is disposed at a proximal end of the body, and the second portion is connected to the first portion and disposed closer to a distal end of the body relative to the first portion.

2. The device of claim 1, wherein the body comprises a guide on a top surface of the body.

3. The device of claim 2, wherein the top surface includes a plurality of markings.

4. The device of claim 1, wherein the first post and the second post are located at the proximal end of the body.

5. The device of claim 1, wherein the body includes a first body and a second body.

6. The device of claim 5, wherein the first body and the second body move relative to one another.

7. The device of claim 1, wherein the first post and the second post are a raised cross shape.

8. The device of claim 1, wherein the body includes a channel.

9. An assembly comprising packaging and the device of claim 1.

10. The assembly of claim 9, further comprising a column nut.

11. The device of claim 1, wherein the body comprises a V-shaped guide on a top surface of the body.

12. A method of using a device, comprising:
providing a nut with a loosened collar;
inserting a column into the nut; and
placing the nut on the device,
wherein the device includes a body including a first post and a second post positioned on opposite sides of a recessed area,
wherein the recessed area includes a first portion and a second portion,
wherein the first portion has a first depth and a first largest width that is greater than a second depth and a second largest width of the second portion,
wherein the first largest width is measured along a partially quadrilateral-shaped area of the first portion, and
wherein the second portion includes a semi-cylindrical concave configuration.

13. The method of claim 12, wherein the nut includes flanges that are positioned on the first post and the second post, and a body of the nut is positioned in the recessed area.

14. The method of claim 12, further comprising, pushing the column into the nut until a distal end of the column reaches a marking on the device.

15. The method of claim 14, further comprising, tightening a collar of the nut to inhibit the column from moving.

16. The method of claim 15, further comprising, removing the nut and inserted column from the device.

17. A device comprising:
   a body including a recessed area having a first portion and a second portion, wherein the first portion has a first depth and a first width that greater than a second depth and a second width of the second portion,
   wherein the body includes a plurality of posts positioned proximate to the recessed area, and
   wherein each post of the plurality of posts is configured to receive a nut.

18. The device of claim 17, wherein the first portion and the second portion are in communication with one another.

19. The device of claim 17, wherein the plurality of posts includes a first post and a second post positioned on opposite sides of the recessed area.

* * * * *